United States Patent [19]

Ponczek

[11] Patent Number: 5,713,497
[45] Date of Patent: Feb. 3, 1998

[54] DEER CARRIER

[76] Inventor: Kevin Ponczek, 50 Lord Ave., Bayonne, N.J. 07002

[21] Appl. No.: 680,222

[22] Filed: Jul. 11, 1996

[51] Int. Cl.$^6$ ........................................................ A45F 3/14
[52] U.S. Cl. ............................ 224/157; 224/270; 224/921
[58] Field of Search .................................... 224/184, 103, 224/157, 921, 270

[56] References Cited

U.S. PATENT DOCUMENTS

| | | |
|---|---|---|
| 1,248,843 | 12/1917 | Gay . |
| 2,427,715 | 9/1947 | Cooper ................................. 224/103 |
| 2,431,780 | 12/1947 | Theal .................................. 224/157 |
| 2,931,629 | 4/1960 | Keller . |
| 3,436,778 | 4/1969 | Stevens et al. . |
| 3,486,671 | 12/1969 | Sanders ............................. 224/157 X |
| 3,530,834 | 9/1970 | Hollenback . |
| 3,894,313 | 7/1975 | Miller . |

FOREIGN PATENT DOCUMENTS

| | | | |
|---|---|---|---|
| 479892 | 5/1916 | France .................................. 224/157 |
| 938373 | 9/1948 | France .................................. 224/157 |

*Primary Examiner*—Renee S. Luebke
*Attorney, Agent, or Firm*—Weingram & Associates, P.C.

[57] ABSTRACT

A portable carrier for dead game, e.g. deer is provided. The carrier includes a first tubular member and a second tubular member. The tubular members are removably mountable to each other at one end of each tubular member by, for example a coupling to permit threadably coupling the tubular members to each other. An attachment is mounted to at least one, and preferably both, tubular members, for removably attaching one tubular member in an adjacent and parallel position to the other tubular member. A clamp assembly is mounted to each tubular member for removably clamping a pair of the dead game's legs to such tubular member. The portable device is easily and quickly assembled by detaching the tubular members from each other, mounting the ends to each other and clamping the front legs of the game to a first clamp and the rear legs of the game to a second clamp. The free ends of the joined tubular members are each placed on a person's shoulder and the game carried from the location. After use, i.e. the removal of the game's legs from the clamps, the device is easily collapsed by disconnecting the tubular members from each other and mounting the tubes to each other in an adjacent, parallel relation. Preferably, a removable sling is attached to one of the tubular members for slinging the device over a person's shoulder when the device is in the collapsed stage.

13 Claims, 6 Drawing Sheets

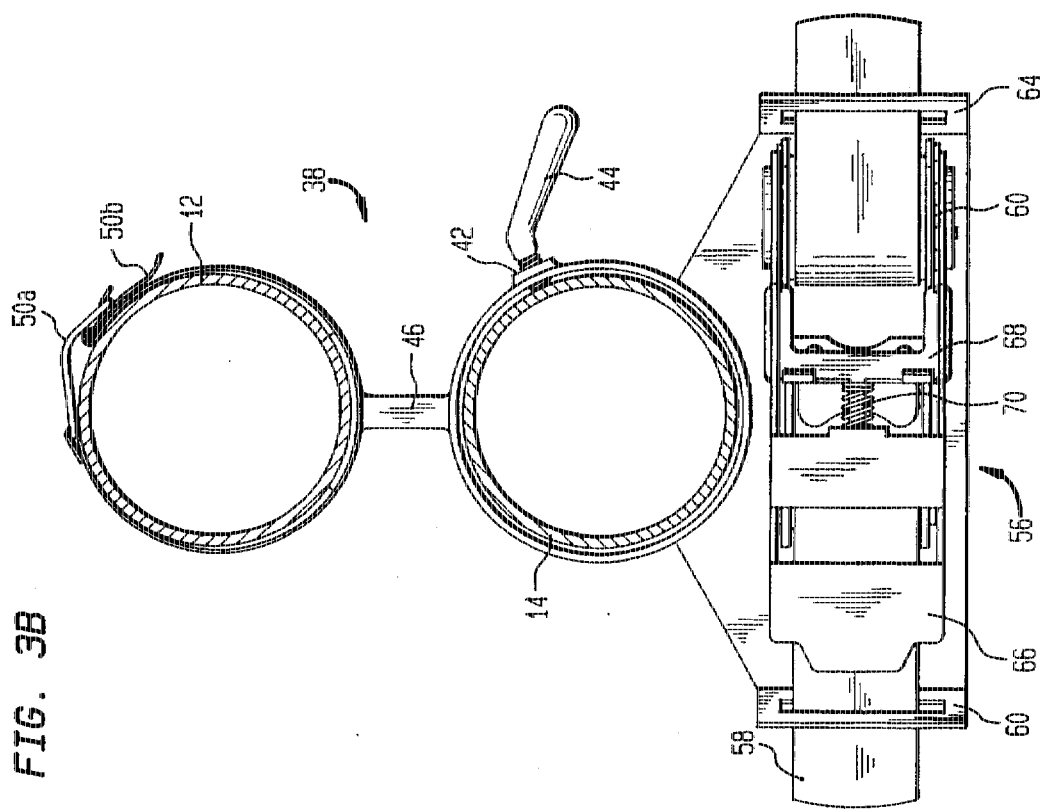
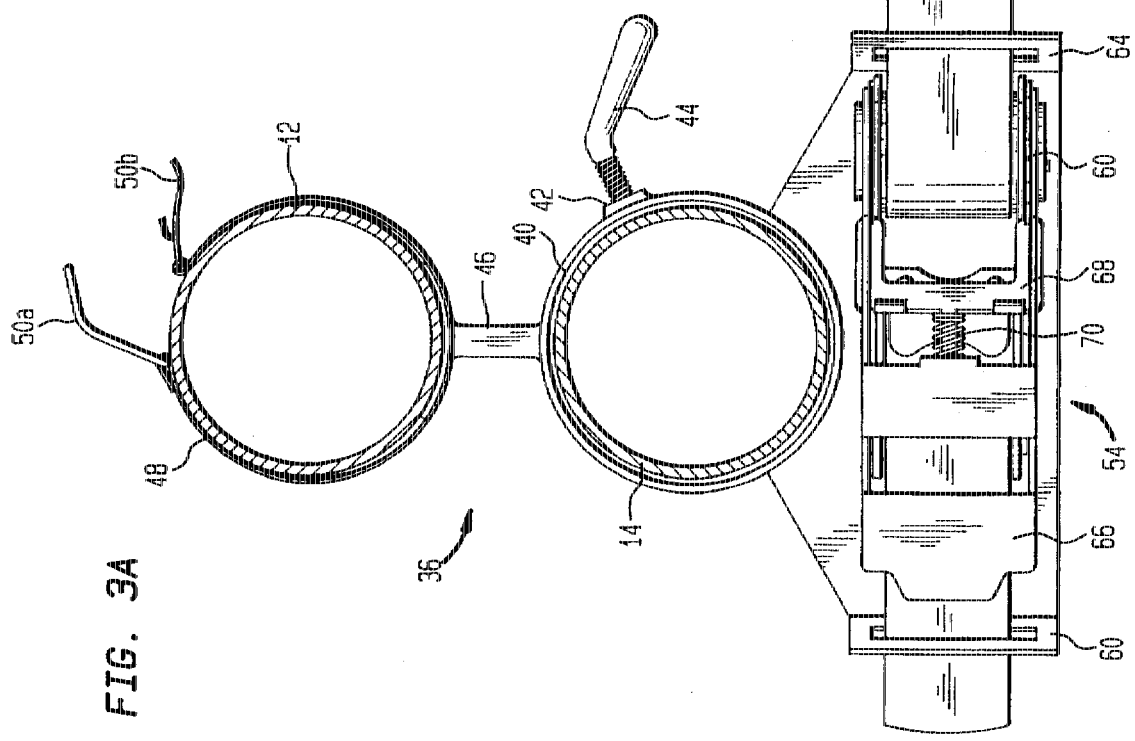

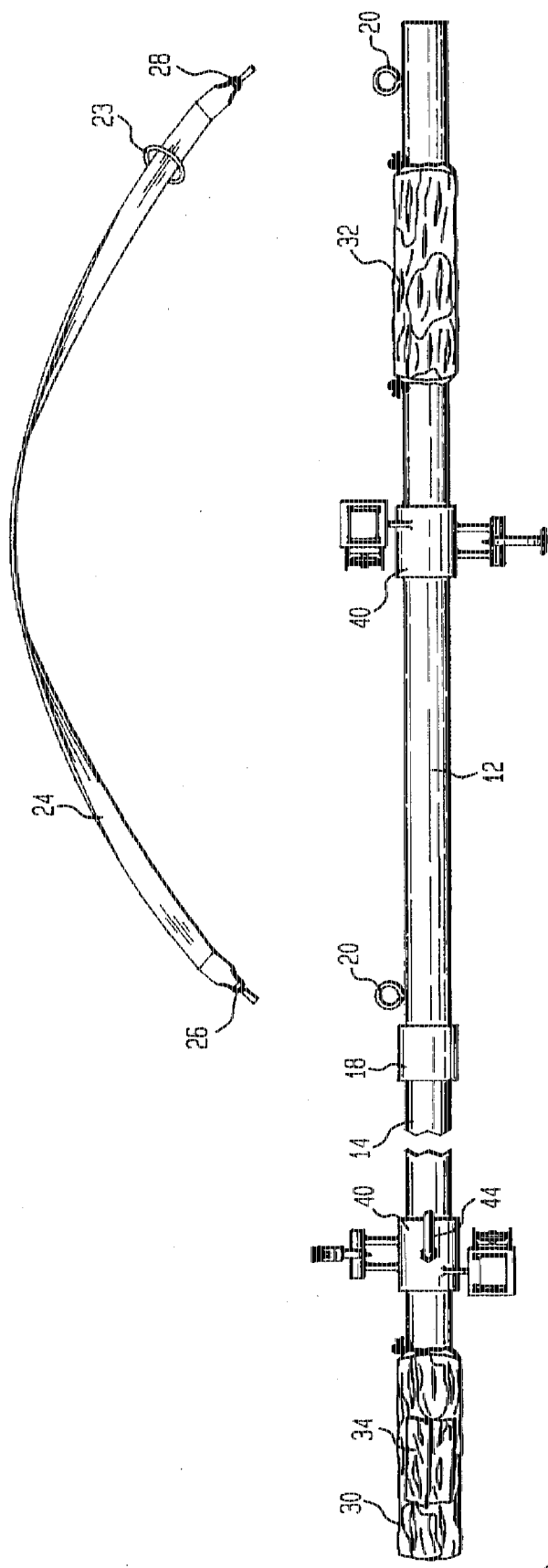

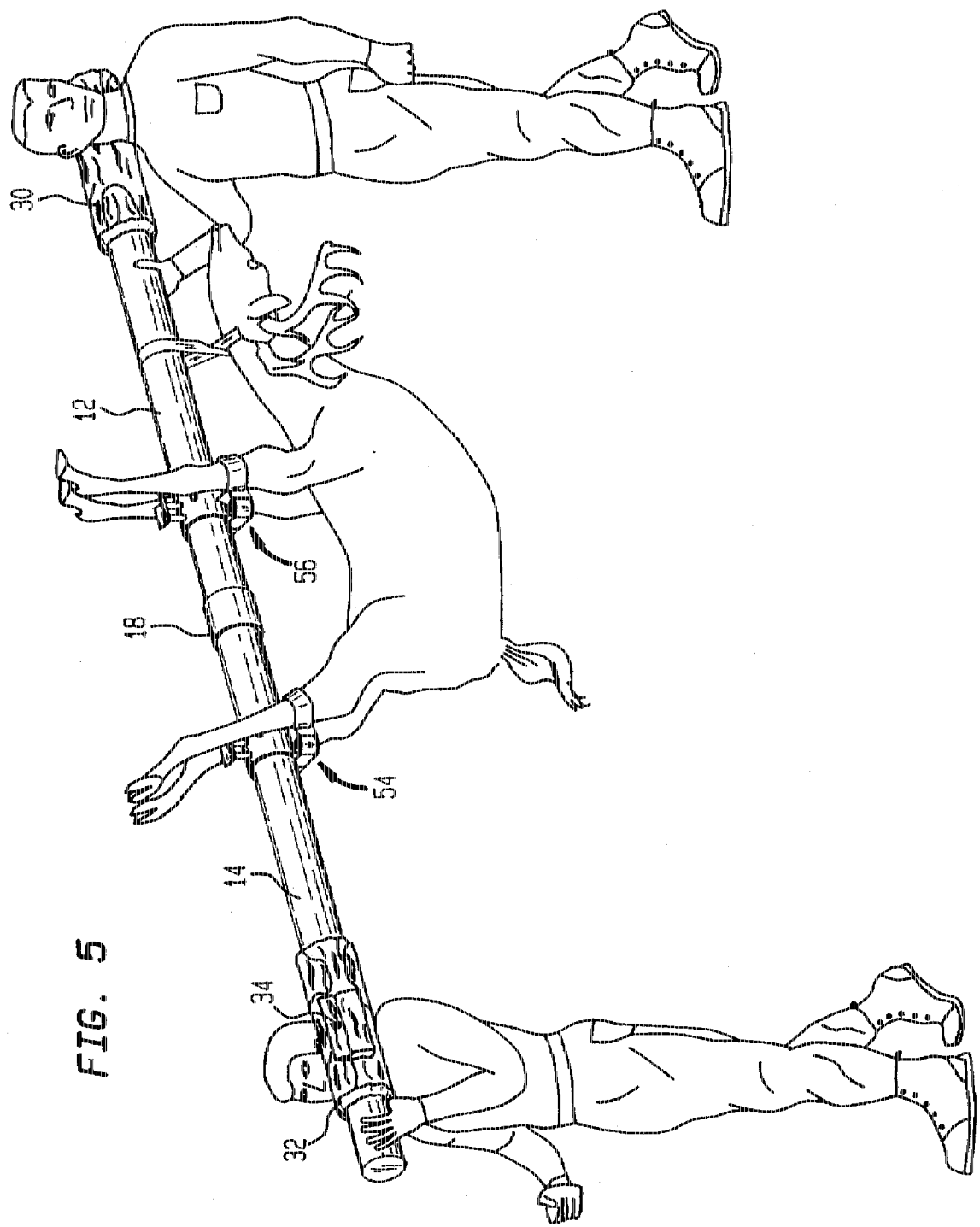

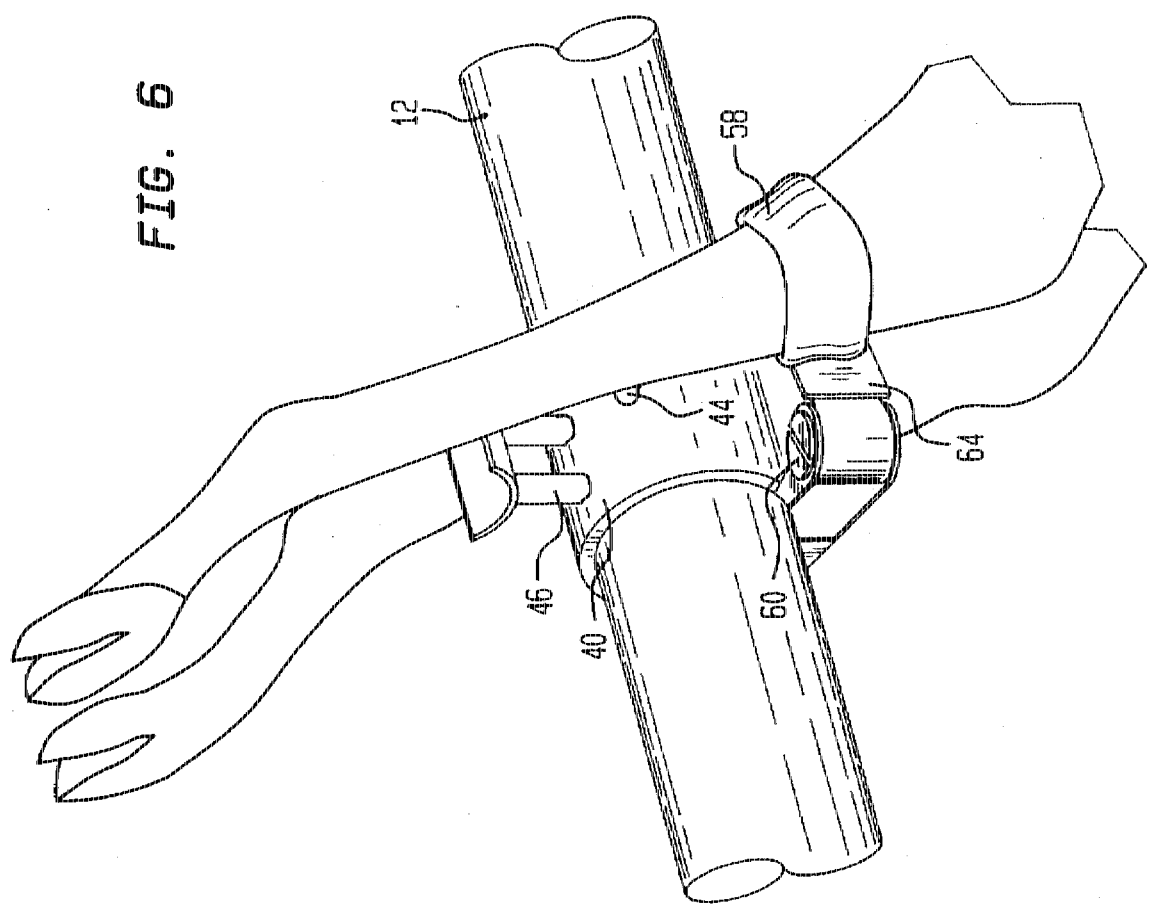

DEER CARRIER

BACKGROUND OF THE INVENTION

1. Field of the Invention

The present invention relates to a portable game carrier that is constructed to be compactly carried in the field, easily assembled for use in carrying game and disassembled for cleaning, storage, maintenance and repair.

2. Related Art

Many devices are known for carrying game, particularly deer or the like. Most devices, however, are difficult and bulky to carry into the field, especially over rugged terrain, difficult to assemble and use, and/or when used can tend to damage the carcass if used improperly.

Known devices are disclosed in the following references:

U.S. Pat. No. 1,248,843 to Gay describes a supporting hook, for example for clamping or gripping the tail of a fish.

U.S. Pat. No. 2,431,780 to Theal describes a harness arrangement which permits two persons to carry heavy objects such as refrigerators, stoves, etc.

U.S. Pat. No. 2,931,629 to Keller describes a deer pull and pulley which can be used for suspending a deer from a tree or alternatively, for dragging the animal to camp from the location at which it was shot and killed.

U.S. Pat. No. 3,436,778 to Stevens et al describes a device for portaging and carrying boats.

U.S. Pat. No. 3,486,671 to Sanders describes a litter back pack assembly mountable on ones body and connectable to one end of an elongated litter for easily and safely transporting a combat casualty thereon.

U.S. Pat. No. 3,530,834 to Hollenback describes an animal suspension rack having an upstanding standard, a clamping device for holding an animal in an extended position at the upper end of the standard, foot pedals for locking and unlocking the clamping device and a base for the standard.

U.S. Pat. No. 3,894,313 to Miller describes a collapsible frame for supporting a slaughtered animal off the ground so that dogs and other animals can not reach the carcass.

French Patent No. 479,892 describes a device for two people to carry a disabled person from the field, one in the front and the other in the back, the disabled person carried therebetween in a sitting-up position.

French Patent No. 938,373 describes a harness for carrying pipes between two persons, the harness resting on the shoulders of the persons.

OBJECTS AND SUMMARY OF THE INVENTION

It is an object of the present invention to provide a carrier for carrying dead game, in particular a deer from the field.

It is a further object of this invention to provide a carrier that is both portable for easy carrying into the field and easily assembled for the task of carrying the deer out of the field.

It is another object of this invention to provide a deer carrier that can be assembled compactly so that it can be easily carried into and out of the field.

It is a further object of this invention to provide a deer carrier which can be easily and completely disassembled for cleaning, maintenance and repair.

This invention is directed to a portable carrier for dead game, e.g. deer. The carrier includes a first tubular member and a second tubular member. The members are removably mountable to each other by, for example a coupling means to permit one end of a tubular member to be threadably coupled to an end of the other tubular member. An attachment means is mounted to at least one, and preferably both, tubular members, for removably attaching one tubular member in an adjacent and parallel position to the other tubular member. A clamping means is mounted to each tubular member for removably clamping a pair of the dead game's legs to such tubular member.

The portable device may be easily and quickly assembled by detaching the tubular members from each other, mounting the ends to each other and clamping the front legs of the game to one clamping means and the rear legs of the game to the other clamping means. The free or distal ends of the joined tubular members are each placed on a person's shoulder and the game carried from the location. Likewise, after use, i.e. after removal of the animal's legs from the clamps, the device may be easily collapsed by disconnecting the ends of the tubular members from each other and attaching the tubes to each other in an adjacent, parallel relation. Preferably, a sling is releasably attached to one of the tubular members to sling the carrier onto a person's shoulder.

BRIEF DESCRIPTION OF THE DRAWINGS

The present invention will become more fully understood from the detailed description given hereinbelow and the accompanying drawings which are provided for illustration only, and thus are not limitative of the present invention, wherein:

FIGS. 3A and 3B are cross-sectional views of the portable carrier of this invention taken along line 3—3 of FIG. 1, with FIG. 3A showing an open attachment means for removably attaching one tubular member in an adjacent, parallel position to the other tubular member, and FIG. 3B showing a closed attachment means.

FIG. 4 is a side elevational view of the portable carrier of this invention assembled and ready for carrying game.

FIG. 5 is a perspective view of the portable carrier of this invention assembled and in use to carry a deer.

FIG. 6 is an enlarged perspective view of a clamping means of the present invention which is removably clamping a pair of the deer's legs to the carrier.

DETAILED DESCRIPTION OF THE INVENTION

Referring to the Figures, the portable game carrier 10 (the "carrier") of the present invention is used for carrying dead game, such as deer, antelope, bear, etc. from the field. The carrier 10 is typically used on hunting expeditions where it is carried into the field in a collapsed or portable configuration such as that shown in FIGS. 1 and 2 and, if a game animal is killed, assembled or reconfigured for use to carry the animal from the field as shown in FIGS. 4 and 5.

Figure 1:
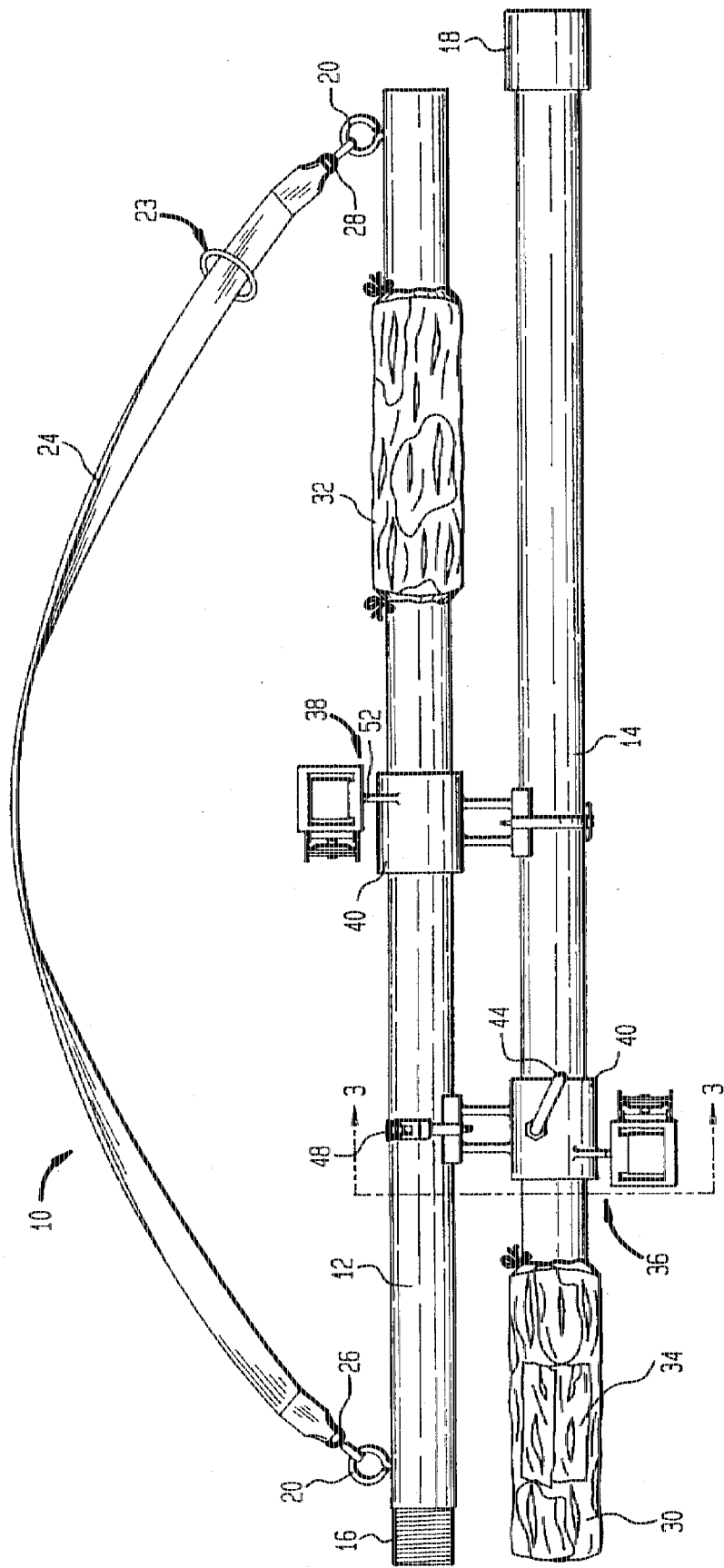
FIG. 1 is a side elevational view of the portable carrier of the present invention, disassembled, prior to use and in preparation for carrying into the field.
Figure 2:
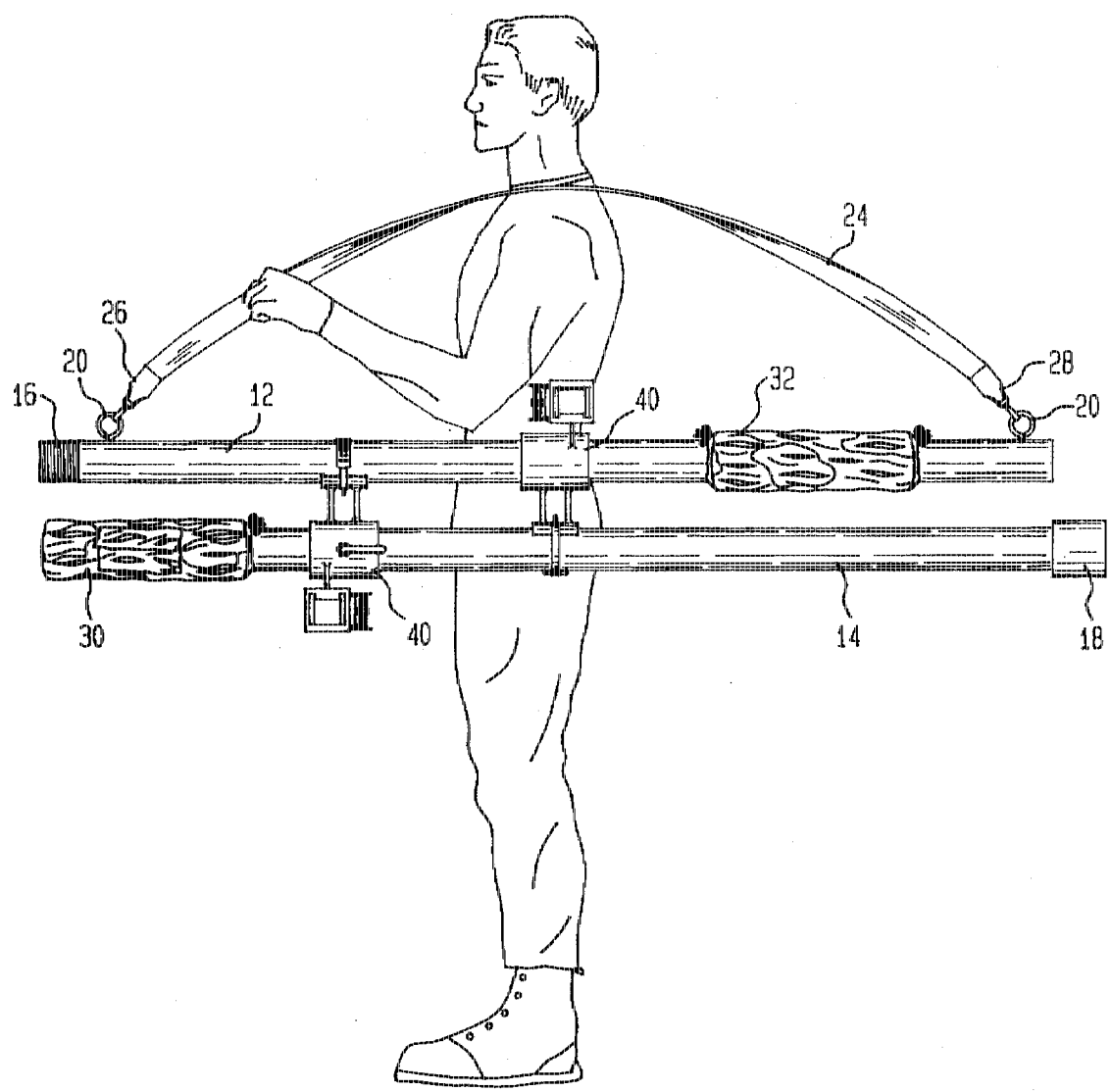
FIG. 2 is a side elevational view of the portable carrier of this invention, disassembled, prior to use and being carried into the field.

Referring to FIGS. 1 and 2, the carrier 10 includes a first tubular member 12 and a second tubular member 14. Preferably, each of the tubular members 12,14 is cylindrical and of thin walled construction. In order to minimize weight and corrosion, it is desirable that the tubular members 12,14 be made of a light weight, relatively strong polymeric material, e.g., polypropylene or polyethylene plastic, although the members 12,14 can be made of metal. The tubular members 12,14 function as support members to support the dead game above the ground when being transported from the field, bush, etc.

The tubular members 12,14 are designed to be removably mountable to each other to form a long cylindrical carrying tube as shown in FIGS. 4 and 5. Referring to, for example, FIGS. 1 and 4, the tubular member 12 is provided with opposed ends, one of which is an externally threaded end 16 which mates with and threadably engages an internally threaded coupling portion 18 of the tubular member 14. The coupling 18 is disposed at an end of the tubular member 14. Other coupling means may be used such as, for example, a quick-disconnect or bayonet coupling. Preferably, the coupling 18 is made from the same material as the tubular members 12,14. An eye-hook 20 is mounted to opposite ends of the tubular member 12. The eye-hooks 20 are spaced apart each being in proximity to a corresponding end of tubular member 12.

A sling strap 24 is removably attached to the tubular member 12. The sling 24 has opposed ends 26,28, each one of which is adapted to releasably engage a corresponding one of the eye hooks 20 of the tubular member 12. A ring 23, whose use is described hereinafter, is on sling 24.

In the embodiment depicted in the Figures, the carrier 10, also includes cushioning means 30,32. Each one of the cushioning means 30,32 is removably mounted proximate to a corresponding one of the ends of the tubular members 12,14, respectively, and distal from the coupling 18. Preferably, each one of the cushioning means 30,32 is constructed as a cylindrical foam pad covered by a camouflage material or a bright red or yellow material. The pads 30,32 each slip over an end of the corresponding tubular member 12,14 and may be removed for washing, storing or replacement. One of the pads 30 is covered on one end so that it can not slide over the end of tubular member 12. The other pad 32 has both ends open so that it can slide over the end of tubular member 14, so for example, when used as depicted in FIG. 5, the front of member 14 can be gripped by the person walking forward. The covering material may have a pocket 34 therein to store and carry miscellaneous items such as hunting or other outdoor gear.

In the preferred embodiment depicted in the Figures, each of the tubular members 12,14 has an attachment means 36,38 mounted thereto. The attachment means 36,38 are adapted to removably attach the tubular members 12,14 in an adjacent, parallel relationship with each other, such as shown in FIG. 1. Preferably, the attachment means 36,38 are each slidably and adjustably mounted to their corresponding one of the tubular members 12,14.

Referring to FIGS. 3A and 3B, each one of the attachment means 36,38 comprises a tubular sleeve 40 which is slidably and adjustably mounted to a corresponding one of the tubular members 12,14 respectively. Typically, the sleeve 40 is formed with an aperture 42 extending therethrough, the sidewall of the sleeve 40 surrounding the aperture 42 and being formed with threads to threadably engage a threaded portion of a locking member 44 which extends through the aperture 42 in the tubular sleeve 40 to abut against the underlying one of the tubular members 12,14. The locking member 44 can be tightened or loosened to lock or unlock the tubular sleeve 40 with respect to the tubular member 12,14 to control movement of the attachment means 36,38 along the tubular member 12,14.

Still referring to FIGS. 3A and 3B, the tubular sleeve 40 has attached thereto a web assembly 46. The web assembly 46 preferably includes two web members which terminate in a restraining means 48, such as a clamp. The clamp 48 is adapted to receive and encircle the other tubular member when the members are arranged in the collapsed stage (FIG. 1). The clamp 48 is opened and closed by a latch mechanism consisting of a coacting pair of arms 50a,50b. Thus, the attachment means 36,38 permits the tubular members 12,14 to be removably mounted to each other in an adjacent, preferably parallel relationship such as shown in FIGS. 1 and 2.

Another web 52 extends from each attachment means 36,38 at an opposite side of the tubular sleeve 40. The web 52 terminates in a clamping means 54,56 to releasably clamp a pair of legs of the game. As shown in FIGS. 3A,3B and 6, each clamping means 54,56 comprises a strap 58 that can be passed around the animal's legs, cinched tight, then locked into position with the legs securely restrained (FIG. 6). A ratchet assembly 60 is associated with each one of the clamping means 54,45 to control the degree of tension on the strap 58 and therefore, the straps 58 against the animal's legs.

The web 52 associated with each one of the clamping means 54,56 is provided with a pair of buckle plates 62,64 connected to opposed ends of the web 52. Preferably, the buckles 62,64 are formed integral with the web 52. The ratchet assembly 60 is secured to the web 52 intermediate the opposed buckles 62,64. A handle 66 coacts with the ratchet 60. The strap 58 is threaded from the ratchet through one of the buckles 62 around a side of the web 52 opposite that side of the web to which the rachet 60 is mounted. The strap 58 is then threaded through the other one of the opposed buckles 64 and brought therearound to be anchored at another portion of the ratchet 60. The ratchet 60 permits the strap 58 to be slackened so that a front or rear pair of the animal's legs can be received between the strap 58 and the buckles 62,64, after which the handle 66 is operated to cinch up the strap 58 to restrain the animal's legs. A quick release lever 68 is spring 70 biased to permit the handle 66 to clear the ratchet 60 so that the strap 58 can be immediately and effectively slackened to remove the animal's legs therefrom.

Thus, in the preferred embodiment depicted in the Figures, the clamping means 54,56 and attachment means 36,38 are both adjustably and slidably mounted to the tubular member 12,14 to provide the optimum positioning when transporting the carrier 10 into the field (FIGS. 1 and 2) and the optimum positioning when carrying game from the field (FIG. 5).

Referring to FIG. 5, the strap 24 may be wrapped around the animals head and adjusted through the use of ring 23 and the clips on the strap ends 26,28, to raise the animal's head.

In use, referring to FIGS. 1 and 2, the user rests the sling strap 24 on his or her shoulder to transport the carrier 10 into the field. The sling 24 can also be provided with padding to add more comfort for the user when the sling 24 rests against the user's shoulder. The attachment means 36,38 connects the tubular members 12,14 in an adjacent, parallel position with each other to provide a compact assembly. After the game is killed and it is desired to carry the game from the field, the attachment means 36,38 are disconnected (FIGS. 3A and 3B) and the tubular members 12,14 coupled together as shown in FIG. 4. The sling 24 is preferably removed from the tubular member so that it does not become an obstruction to the carrying of the game. Besides, at this stage of using the carrier 10, the sling 24 is relatively useless because the weight of the animal will be borne on the hunters' shoulders on top of which the cushioning means 30,32 of the carrier 10 will rest. The clamping means 54,56 are then slidably adjusted via the locking member 44 to an appropriate distance to clamp the game's legs therein (FIGS. 5 and 6). In carrying the game out of the field, the cushioning means 30,32 are placed on each person's shoulder and the game carried therebetween supported above the ground.

The preferred embodiment of the present invention has been described in considerable detail. It will be understood that this description is intended to be illustrative rather than restrictive. Many of the details of the structures disclosed may be modified or changed without departing from the spirit and scope of the invention. Accordingly, we do not desire to be restricted to the exact construction described herein and in the appended claims.

What is claimed is:

1. A portable carrier for dead game, the game having a pair of front and rear legs, the carrier comprising:
   a first tubular member and a second tubular member, the members being removably mountable to each other at one end of each tubular member;
   attachment means mounted to at least one tubular member for removably attaching one tubular member in an adjacent and parallel position to the other tubular member; and
   clamping means mounted to each tubular member for removably clamping a pair of legs to such tubular member.

2. The portable carrier of claim 1, further comprising a cushioning means mounted proximate each of the other ends of such tubular members.

3. The portable carrier of claim 1, further comprising a cushioning means removably mounted proximate each of the other ends of such tubular members.

4. The portable carrier of claim 1, wherein the attachment means is mounted to each tubular member.

5. The portable carrier of claim 1, wherein the attachment means is slidably and adjustably mounted to each tubular member.

6. The portable carrier of claim 1, wherein the clamping means is slidably and adjustably mounted to each tubular member.

7. The portable carrier of claim 1, wherein the attachment means and clamping means are slidably and adjustably mounted to each tubular member.

8. The portable carrier of claim 1, wherein the attachment means and clamping means are attached to a mounting means for slidably and adjustably mounting them to each tubular member.

9. The portable carrier of claim 1, further comprising a sling strap, each end of which is removably attached proximate each of the ends of one of the tubular members.

10. A portable carrier for dead game, the game having a pair of front and rear legs, the carrier comprising:
    a first cylindrical tubular member and a second cylindrical tubular member;
    coupling means mounted to the tubular members at one end of each tubular member for threadably coupling the tubular members to each other; and
    a sleeve slidably and adjustably mounted on each cylindrical tubular member and securing means on the sleeve for securing the sleeve to a selected position on the tubular member, each sleeve having attached thereto:
       an attachment means for removably attaching one tubular member in an adjacent and parallel position to the other tubular member, and
       a clamping means for removably clamping a pair of legs to such tubular member.

11. The portable carrier of claim 10, further comprising a cushioning means slidably and removably mounted proximate each of the other ends of such tubular members.

12. A carrier for an animal, the carrier comprising:
    a first support member having a first end portion;
    a second support member having a second end portion adapted to be releasably engaged to the first end portion of the first support member;
    attachment means mounted to at least one of the first and second support members for releasably mounting the first and second support members in an adjacent relationship; and,
    restraining means mounted to each one of the first and second support members for restraining a portion of the animal.

13. A carrier for an animal carcass, the carrier comprising:
    a pair of tubular members each of which has a corresponding end portion adapted to releasably engage an end portion of the other tubular member;
    attachment means mounted to at least one of the pair of tubular members for releasably mounting the pair of tubular members in an adjacent relationship; and
    restraining means mounted to at least one of the pair of tubular members for restraining a portion of the animal carcass.

* * * * *